(12) United States Patent
Nakajima et al.

(10) Patent No.: US 11,982,884 B2
(45) Date of Patent: *May 14, 2024

(54) OPTICAL SIGNAL PROCESSING DEVICE

(71) Applicant: Nippon Telegraph and Telephone Corporation, Tokyo (JP)

(72) Inventors: Mitsumasa Nakajima, Musashino (JP); Toshikazu Hashimoto, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 954 days.

This patent is subject to a terminal disclaimer.

(21) Appl. No.: 16/967,205

(22) PCT Filed: Feb. 26, 2019

(86) PCT No.: PCT/JP2019/007345
§ 371 (c)(1),
(2) Date: Aug. 4, 2020

(87) PCT Pub. No.: WO2019/167953
PCT Pub. Date: Sep. 6, 2019

(65) Prior Publication Data
US 2020/0363660 A1 Nov. 19, 2020

(30) Foreign Application Priority Data

Mar. 2, 2018 (JP) ................. 2018-037580

(51) Int. Cl.
*G02F 1/01* (2006.01)
*G02F 1/05* (2006.01)
*H04J 14/02* (2006.01)

(52) U.S. Cl.
CPC .......... *G02F 1/0102* (2013.01); *G02F 1/0126* (2013.01); *G02F 1/0508* (2013.01); *H04J 14/02* (2013.01)

(58) Field of Classification Search
CPC .... G02F 1/0102; G02F 1/0126; G02F 1/0508; H04J 14/02
See application file for complete search history.

(56) References Cited

U.S. PATENT DOCUMENTS

2003/0198478 A1* 10/2003 Vrazel ................. H04B 10/675
398/183
2006/0263098 A1* 11/2006 Akiyama .............. H04B 10/66
398/188

(Continued)

FOREIGN PATENT DOCUMENTS

JP 09160895 A * 6/1997
JP 2010079003 A * 4/2010 ............. H04B 10/60

OTHER PUBLICATIONS

Daniel Brunner et al., *Parallel Photonic Information Processing at Gigabyte Per Second Data Rates Using Transient States*, Nature Communications, vol. 4, Article No. 1364, Jan. 15, 2013, pp. 7.

(Continued)

Primary Examiner — Pranesh K Barua
(74) Attorney, Agent, or Firm — Workman Nydegger

(57) ABSTRACT

There is provided an optical signal processing device that generates a mask function in an optical domain to enable high-speed RC processing. For light emitted from a laser light source, an optical modulator modulates at a modulation period at least one of the intensity and phase values of the optical electric field. Thereby, the light emitted from the laser light source becomes an input signal. The input signal is entered into an optical FIR filter unit. For the input signal, the term corresponding to the mask function is multiplied at the optical FIR filter unit and weighted. Thereby, the input signal is converted into an input signal modulated. The modulated input signal enters via an optical coupler, an optical circulation circuit which is loaded with a variable attenuator and a nonlinear response element. The circulating (Continued)

optical signal is branched into two by an optical coupler. One branched light is converted into an intermediate signal at an optical receiver. The intermediate signal is computed by a formula at an electric signal processing circuit, and thereby, the operation as RC can be performed.

10 Claims, 6 Drawing Sheets

(56) References Cited

U.S. PATENT DOCUMENTS

2021/0406648 A1* 12/2021 Lathrop .................. G06N 3/08
2022/0360340 A1* 11/2022 Nakajima ............ H04B 10/572

OTHER PUBLICATIONS

International Search Report and Written Opinion dated May 14, 2019, issued in PCT Application No. PCT/JP2019/007345, filed Feb. 2, 2019.

* cited by examiner

OPTICAL SIGNAL PROCESSING DEVICE

TECHNICAL FIELD

The present invention relates to an optical signal processing device capable of speeding up reservoir computing.

BACKGROUND ART

Attention has been attracted to machine learning with neural networks (NN) modeled after brain information processing. NN is a large-scale nonlinear network in which many neurons with nonlinear responses are coupled by synapses, and in particular, deep learning with a hierarchical NN in which neurons are arranged in a multilayer form has widely been employed. To handle time series data, NN typically requires a recursive network structure capable of referring to past information. Such NN is called recurrent neural network (RNN), which typically uses a network structure having feedback coupling between hierarchical NN layers. Although RNN has widely been employed for learning and processing of time series data such as sound recognition and sensing data, such RNN is disadvantageous in that, since synaptic coupling explodes with increasing the numbers of layers and neurons, more time is required for computation.

As a method for solving such a problem, an optical computing technique modeled after cerebellar information processing has been proposed in recent years, which is called reservoir computing (RC) (see Non-Patent Literature 1).

FIG. 1 is a schematic configuration of a typical RC circuit. This configuration consists of an input layer 101 in which an input signal couples with each neuron, an intermediate layer 102 in which each neuron couples with each other, and an output layer 103 in which signals of each neuron are added up and output. When an input signal u(n) is input to the input layer 101, an output signal y(n) from the output layer 103 is determined by Formulas (1) and (2) below.

Formula 1

$$x_i(n) = f\left\{\sum_j^N \Omega_{ij} x_j(n-1) + m_i u(n)\right\} \quad (1)$$

Formula 2

$$y(n) = \sum_i^N \omega_i x_i(n) \quad (2)$$

Note that N is the number of neurons, and $x_i(n)$ is the state of the i-th neuron at the time step n. Furthermore, $\Omega_{ij}$ is a coefficient representing mutual coupling between the neurons, $m_i$ is a coefficient representing coupling of the input signal with the neurons, and $\omega_i$ is a coefficient representing coupling intensity of each neuron to the output. Furthermore, f(•) represents the nonlinear response at each neuron, in which, for example, tan h(•) is frequently used.

RC significantly differs from a typical RNN in that networks of the input layer 101 and the intermediate layer 102 are fixed, and a variable used for learning is a weight coefficient of the output layer 103, that is, only coupling intensity $\omega_i$ of each neuron to the output. This method can greatly reduce variables to be learned, which thus has a great advantage in time series learning in which data is huge and high-speed processing is required.

Furthermore, this method is also advantageous in terms of storage method of past information. A signal entered into RC continues to drift for some time between neurons present in the intermediate layer 102. This means that RC itself retains short-term storage capacity and information interchange capacity. Accordingly, RC does not require operations of a typical RNN such as storing signals at previous time steps to an external memory and again referring to the data stored in the memory.

RC has been reported on its simple implementation using time delay as in FIG. 2 and thus gained attention (Non-Patent Literature 1). In this method, a loop within a delay time is divided at certain intervals using a nonlinear element with time delay and then, instantaneous optical intensities at respective points on the delay line are considered to be in virtual node states of the network, thereby forming a virtual network. Accordingly, unlike a conventional NN, no optical wiring is needed for many nonlinear elements, which is excellent in that an RC network can be implemented only by a single optical delay line and nonlinear element.

CITATION LIST

Non-Patent Literature

Non-Patent Literature 1: D. Brunner et al., "Parallel photonic information processing at gigabyte per second data rates using transient states," Nature Communications 4, Article number: 1364 (2013)

SUMMARY OF THE INVENTION

Technical Problem

However, the conventional optical implementation method generates the mask function $m_i$ in Formula (2) in the electric domain, and this processing has been a bottleneck of signal processing speed as RC.

The present invention has been made in view of such a problem, and it is an object of the present invention to provide an optical signal processing device that generates a mask function in an optical domain, thereby being capable of high-speed RC processing.

Means for Solving the Problem

To solve the above problem, according to one embodiment of the present invention, there is provided an optical signal processing device including: a light source generating an optical signal; first optical modulation means for modulating at least one of intensity and phase of the optical signal at a first modulation period to generate an input signal; second optical modulation means for modulating at least one of intensity and phase of the input signal at a second modulation period that is shorter than the first modulation period; an optical circulation unit in which the modulated input signal circulates at a predetermined delay length; optical multiplex means for joining the modulated input signal in the optical circulation unit; a nonlinear response element giving nonlinearity to the optical signal circulating in the optical circulation unit; variable optical modulation means for modulating the optical signal circulating in the optical circulation unit; optical branch means for branching part of the optical signal circulating in the optical circulation unit; optical reception means for demodulating branched light output from the optical branch means to obtain an intermediate signal; and a signal processing circuit for weighting the intermediate signal with any coupling weight and taking a sum to obtain an output signal, wherein the signal processing circuit changes the coupling weight so as to reduce an error between the output signal and a teacher signal.

In another embodiment, the second optical modulation means is a finite impulse response filter.

In another embodiment, the second optical modulation means includes: second optical branch means for N-branching (N is an integer of 2 or more) the input signal; N delay lines being connected to each of N branches of the second optical branch means and having different delay lengths; control means for individually controlling intensity or phase of the optical signal passing through the N delay lines; and optical multiplex means for joining again the optical signal controlled by the control means.

In another embodiment, at least one of the second optical modulation means and the optical circulation unit has an optical waveguide structure.

In another embodiment, the predetermined delay length is 10 times or more the second modulation period.

Effects of the Invention

The present invention generates a mask function in the optical domain and thereby reduces processing in the electric domain to enable high-speed RC processing.

DESCRIPTION OF EMBODIMENTS

Hereinafter, an embodiment of the present invention will be explained in detail.

Figure 1:
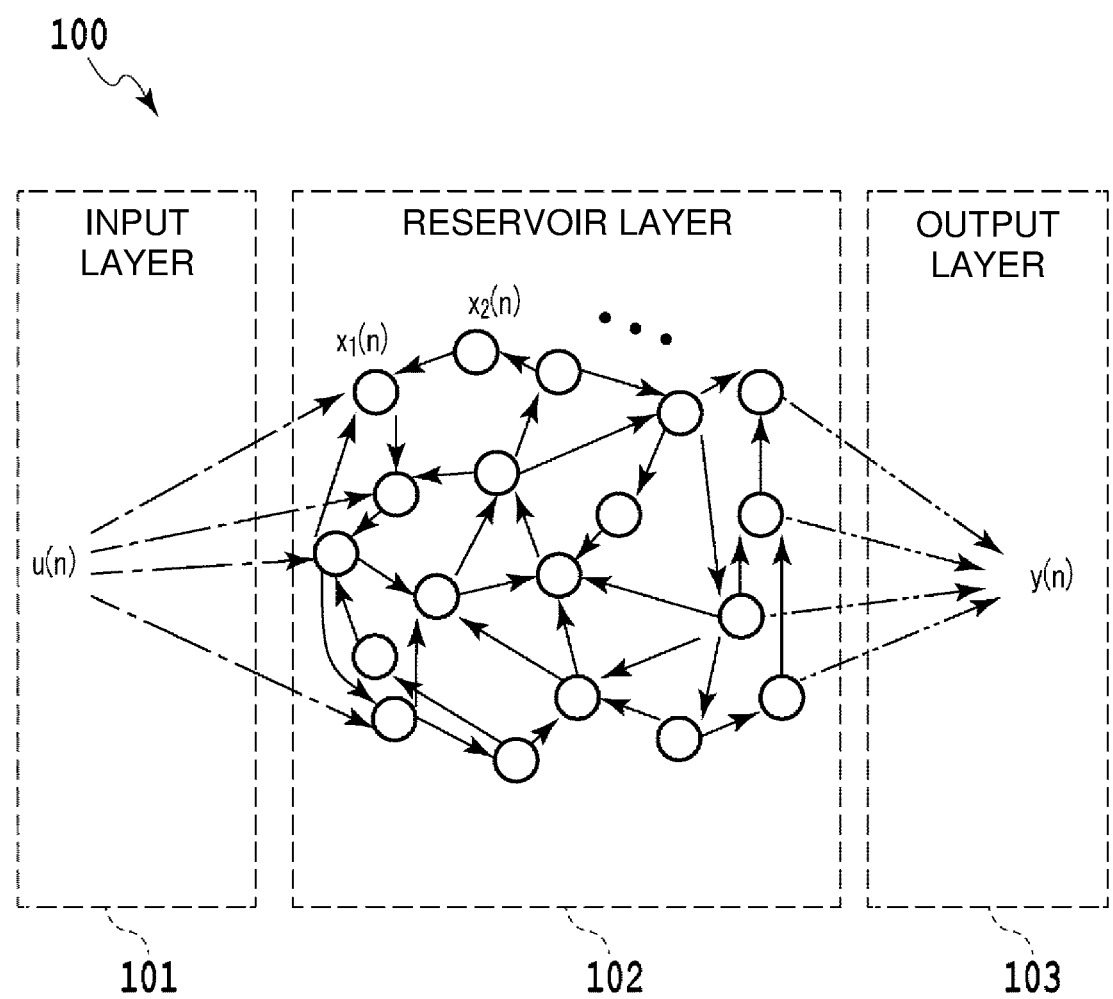
FIG. 1 is a view showing a schematic configuration of a typical RC circuit.
Figure 2:
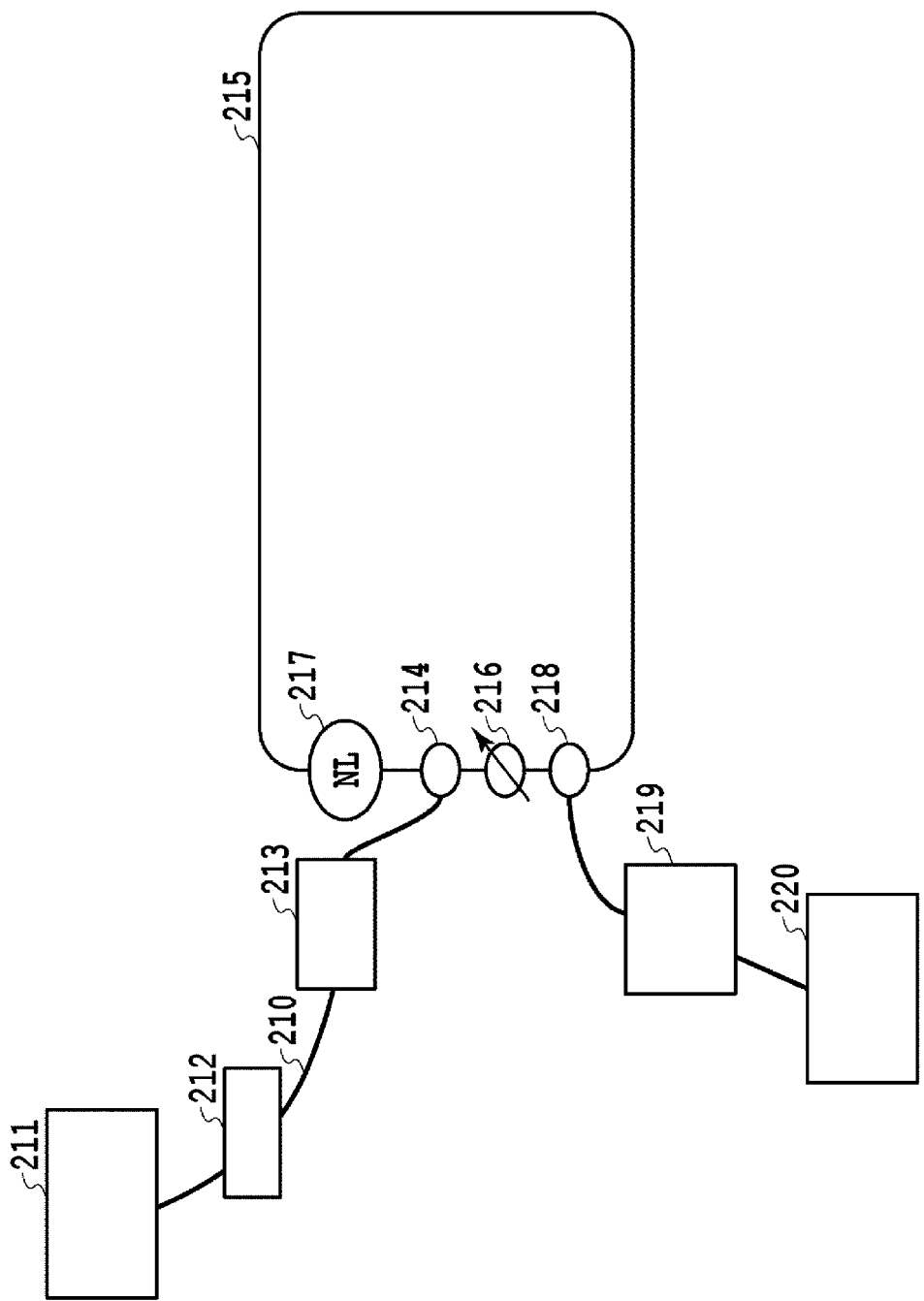
FIG. 2 is a view showing a configuration of an optical signal processing device according to one embodiment of the present invention.

FIG. 2 shows a configuration of an optical signal processing device according to one embodiment of the present invention. For light emitted from a laser light source 211, an optical modulator 212 modulates at a modulation period $T_1$ either or both of the intensity and phase values of the optical electric field. Thereby, the light emitted from the laser light source 211 becomes an input signal u(t). The input signal u(t) is entered into an optical finite impulse response (FIR) filter unit 213. For the input signal u(t), the term corresponding to the mask function is multiplied at the optical FIR filter unit 213 and weighted. Thereby, the input signal u(t) is converted into an input signal u'(t) modulated. The modulated input signal u'(t) passes through an optical transmission path 210 and enters via an optical coupler 214 an optical circulation circuit 215 which is loaded with a variable attenuator 216 and a nonlinear response element 217. Note that the optical modulator 212 includes: an optical circuit that controls optical phase or intensity by a voltage or current to be applied to an interference arm as in, for example, a Mach-Zehnder interference system; and an electric circuit that generates an input electric signal to drive the optical circuit.

Part of the circulating optical signal is branched by an optical coupler 218. One branched light enters the optical coupler 214 via the variable attenuator 216 and circulates in the optical circulation unit 215. The other branched light is converted into an intermediate signal x(t) of the electric signal at an optical receiver 219. This intermediate signal x(t) output from the optical receiver 219 is computed by Formula (2) at an electric signal processing circuit 220, and thereby, the operation as RC can be performed.

Figure 3:
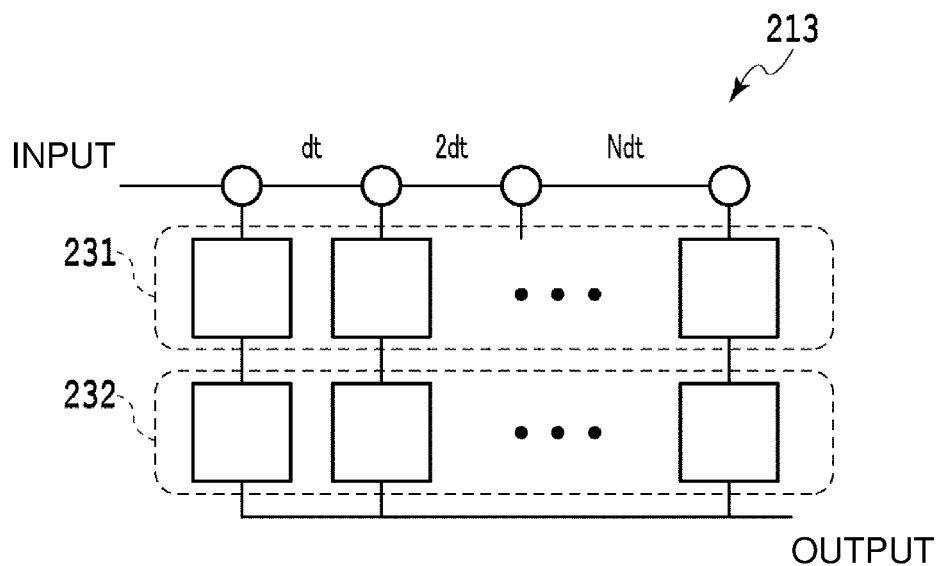
FIG. 3 is a view showing one configuration example of an optical FIR filter unit.
Figure 4:
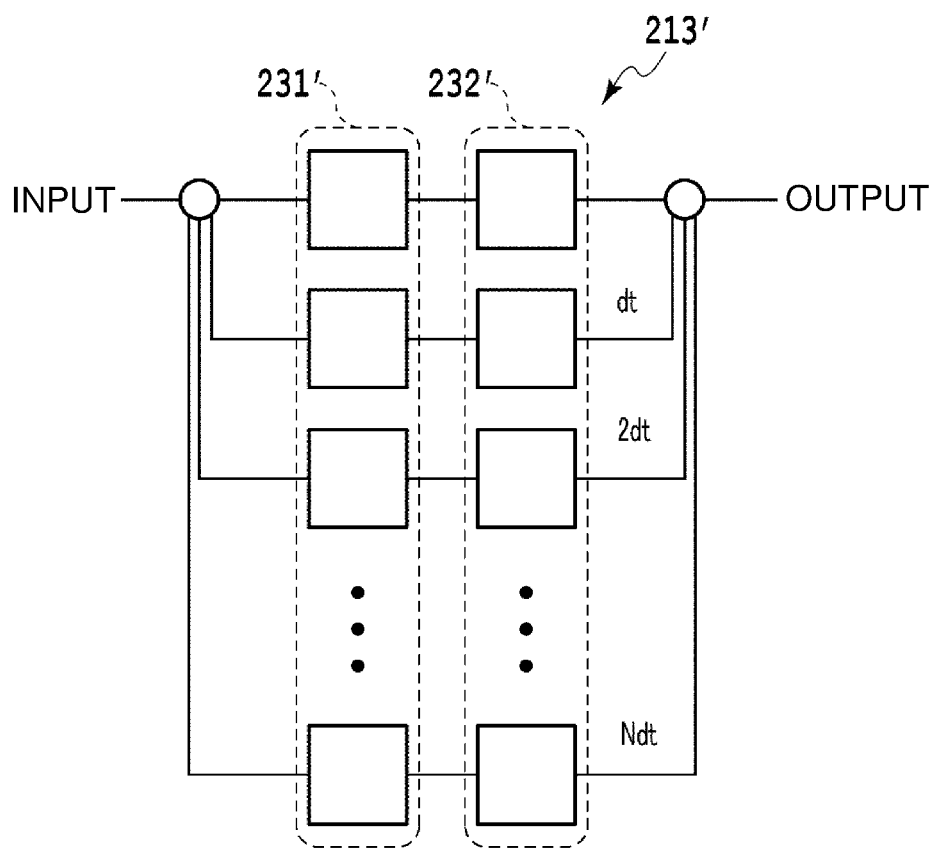
FIG. 4 is a view showing the other configuration example of the optical FIR filter unit.

The optical FIR filter unit 213 includes delay lines, attenuator groups 231 and 231', and phase shifter groups 232 and 232' as shown in, for example, FIGS. 3 and 4, and light is weighted by the attenuation and phase shift of each arm. For the input signal u(t), the term corresponding to the mask function is multiplied by this operation, and thereby, the input signal u(t) is converted into the input signal u'(t) modulated.

Figure 5:
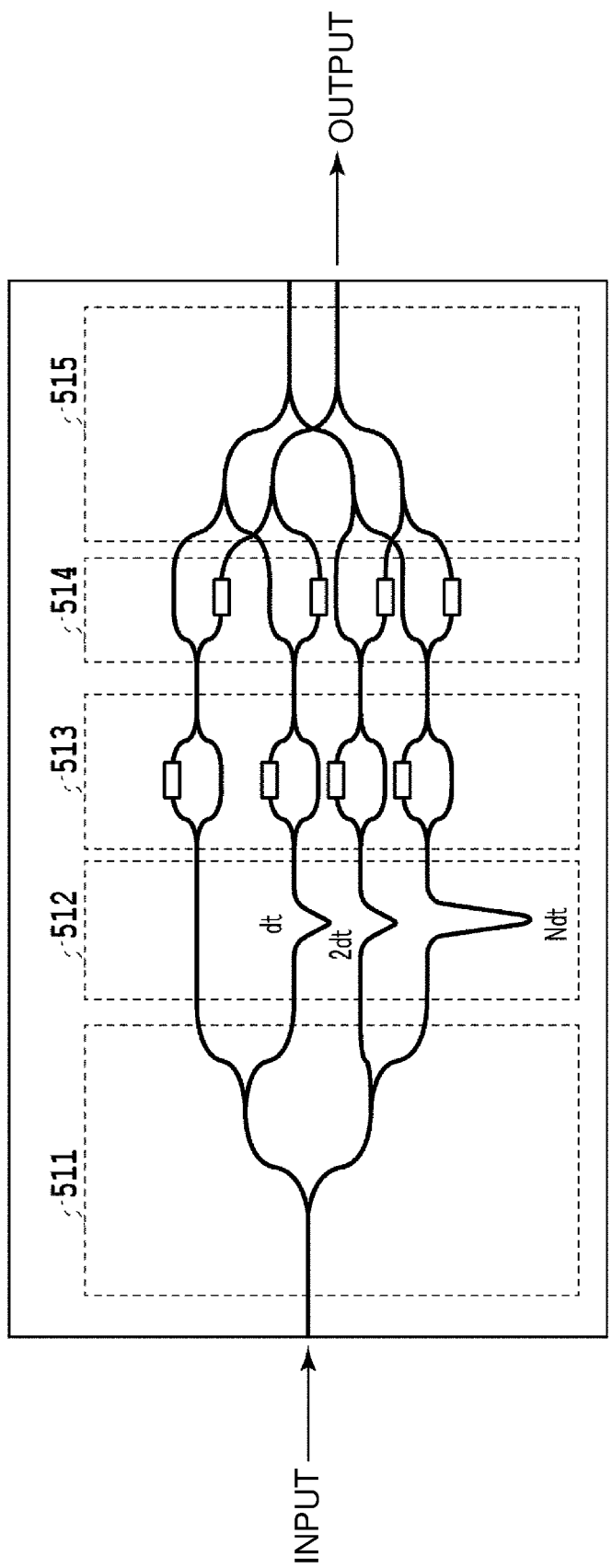
FIG. 5 is a view showing a configuration example of a variable optical filter by an optical waveguide formed on a substrate.
Figure 6A:
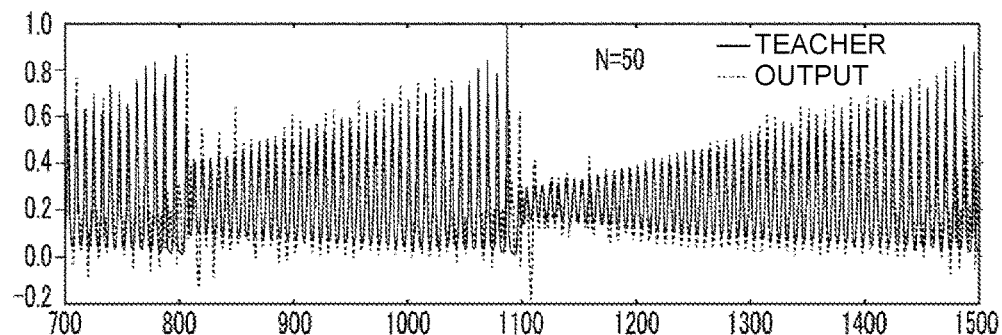
FIG. 6 is a view showing one example of, when mask processing is not performed, a teacher signal and an output signal after learning.
Figure 6B:
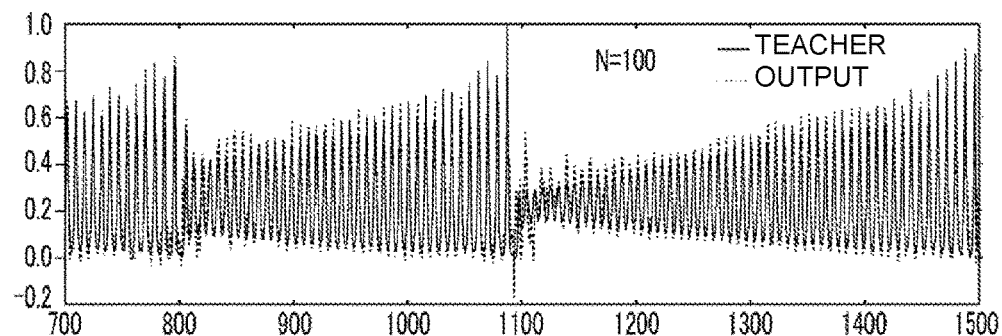
Figure 6C:
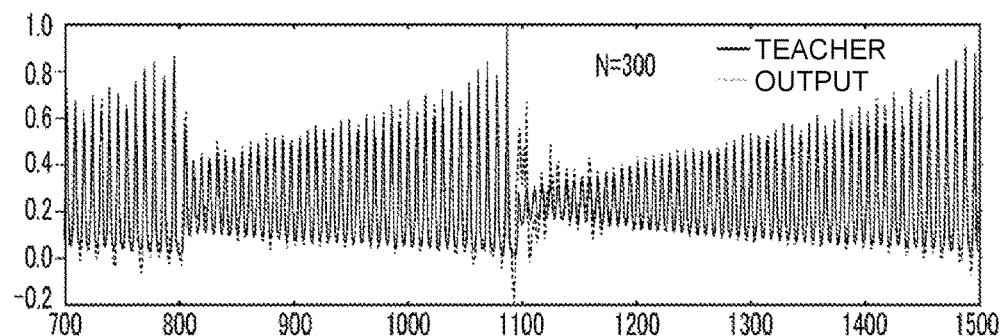
Figure 6D:
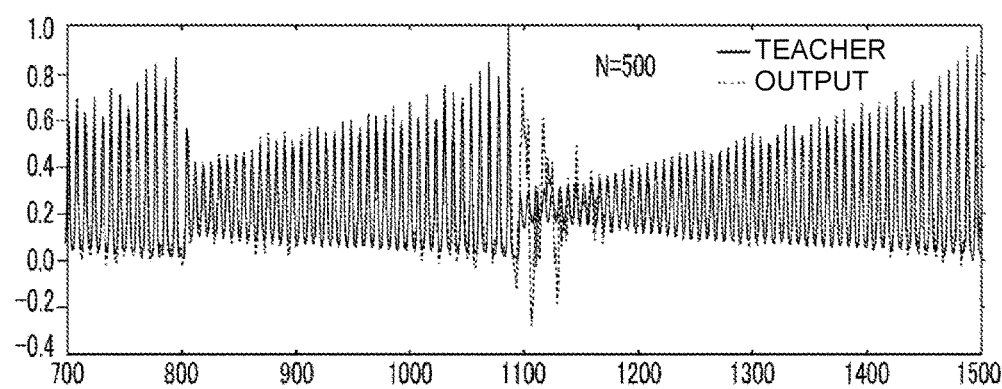
Figure 7A:
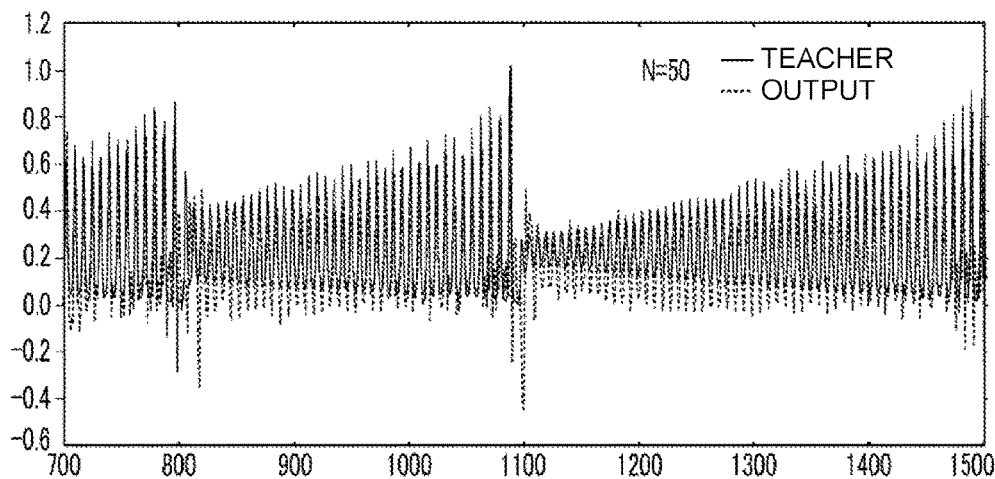
FIG. 7 is a view showing one example of, when mask processing is performed, a teacher signal and an output signal after learning.
Figure 7B:
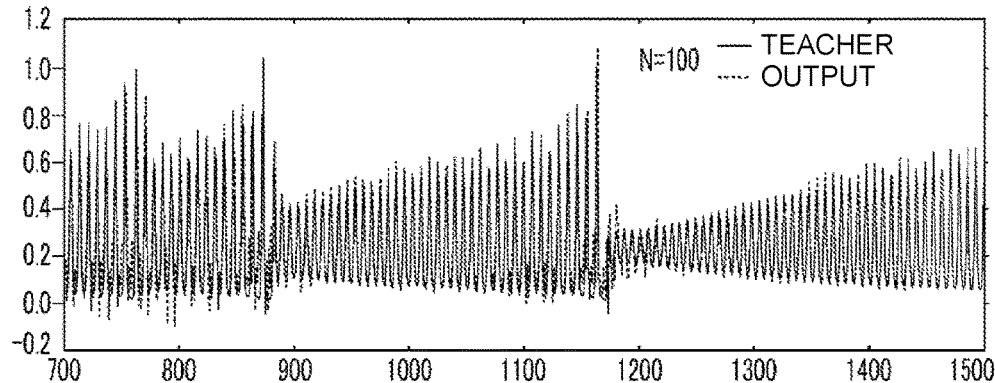
Figure 7C:
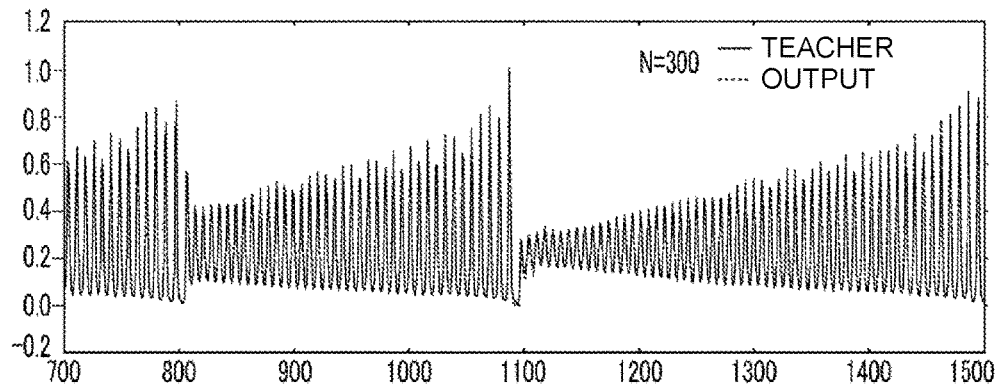
Figure 7D:
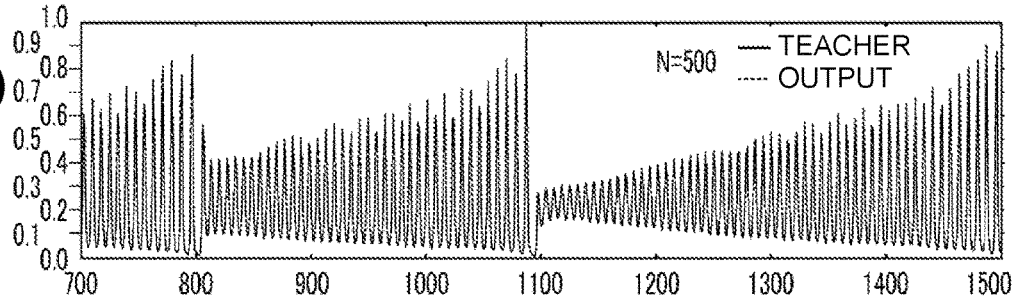

As a specific implementation example of the optical FIR filter unit 213, FIG. 5 shows a configuration example of a variable optical filter by an optical waveguide formed on a substrate. In this element, individual ends of a 1:N-branched optical splitter 511 are connected to a delay line group 512 consisting of N delay lines having delay amounts differing by dt, and each delay line is loaded with a variable optical attenuator (VOA) group 513 consisting of N VOAs and a phase shifter group 514 consisting of N phase shifters. By these elements, the input light is weighted with respect to each time signal and then multiplexed by an optical coupler 515. Thereby, an operation equivalent to that of the optical FIR filter 213 shown in FIG. 3 can be performed.

Although an optical waveguide is used here to form the optical FIR filter 213, a spatial optical system can also be used to obtain a configuration equivalent to that in FIG. 3. In this case, portions corresponding to the VOA group 513 and the phase shifter group 514 can be implemented using a spatial light modulator (SLM) or an MEMS mirror.

For the optical transmission path 210 and the optical circulation unit 215, for example, optical fibers and optical waveguides can be used. Furthermore, for the nonlinear response element 217, an optical amplifier such as a semiconductor optical amplifier (SOA) can be used.

Here, the input signal u'(t) modulated at the optical FIR filter unit 213 will be explained. The modulated input signal u'(t) is described by the following formula.

Formula 3

$$u'(t)=\sum_{i=0}^{K}m_i u(t-iT_2) \quad (3)$$

The mask function $m_i$ corresponds to the weight generated by the i-th arm that constitutes the optical FIR filter unit 213 shown in FIGS. 3 and 4, $T_2$ is the delay time of delay taps, and K is the number of delay taps. The weight $m_i$ can be any value, however, for further excellent learning performance, the weight $m_i$ is preferred to take a variety of values, which is, for example, generated by various pseudo-random number generation algorithms. Here, the delay time $T_2$, which can be adjusted according to the length of the delay line, can be set to any minute value. This enables high-speed signal processing which is difficult to realize by electric circuit processing.

Learning generalization performance is determined by the diversity of the response of the intermediate signal x(t). For this, the circulation length $T_3$ of the optical circulation unit 215 is desired to be set so as to satisfy the relationship of $T_2 \ll T_3$. More specifically, it is desired to be set to $T_3 \geq 10T_2$. The intermediate signal x(t) obtained at the optical receiver 219 is given as a solution of the following evolution formula.

Formula 4

$$\frac{dx(t)}{dt} = \gamma f\{\alpha x(t-T_3) + \beta u'(t)\} \quad (4)$$

Note that α is the product of the gain of the nonlinear element 217 and the attenuation amount of the optical attenuator 216, and β and γ are the branch losses of the optical couplers 214 and 218. Here, where $T_3=T_1$ for simplicity, the intermediate signal x(t) is described by a time discretized by the sampling time $T_1$ as follows. Here, for simplicity, the sampling time $T_1$ is made equal to the circulation length $T_3$ in the signal processing device 220, that is, $T_3=T_1$, and then, the intermediate signal x(t) is described by the time discretized by the sampling time $T_1$ as follows.

Formula 5

$$x_i(n) = f\{\alpha x_i(n-1) + u_i'(n)\} \quad (5)$$

Here, n represents the discretized time step. The subscript i means the i-th response of a signal within the sampling time $T_1$ and further divided by the delay time $T_2$ of delay taps. From the relationship described above, i ranges from 1 to $N=T_2/T_3$. The dynamics of Formula (5), from a comparison with Formula (1), correspond to those of reservoir computing in the case of having a diagonal matrix where the total sum of the diagonal components of the component $\Omega_{ij}$ of the mutual coupling matrix is α and having the number of neurons being N. The modulated input signal $u_i'(n)$ is the dynamics obtained by discretizing Formula (1), to which processing similar to that of the mask function $m_i$ is given by the weighting at the optical FIR filter 213. That is, the electric signal processing circuit 220 computes Formula (2), and thereby, the operation as RC can be performed. The signal processing device 220 may have an A/D conversion function that converts an analog input into a digital value. In such a case of having the A/D conversion function, computation of signals may be performed in the digital domain.

Thus, the present invention includes the optical FIR filter unit 213 that computes the mask function $m_i$ in the optical domain and accordingly is capable of high-speed processing of reservoir computing.

Learning Method

In RC, a variable to be learned is only $\omega_j$, and several methods are available for determining the variable. As an example, the steepest descent method described by Formula (6) will be explained here, but the present invention is not limited thereto, and the effect of the present invention can be obtained regardless of the algorithm of learning.

Formula 6

$$\omega_j(n+1) = \omega_j(n) + k(d(n) - y(n))x_j(n) \quad (6)$$

Here, d(n) is a teacher value, and k is a coefficient for determining how much to move in the slope direction. Since this method merely reduces the energy (error from the learning value) toward the neighboring local minimum, the global search is difficult in this state. Methods for giving an approximation to the global minimum solution include an annealing method. For this too, various methods are proposed, and for example, as a function for the time step n, q may be given as follows.

Formula 7

$$q(n) = q_{min} + h(q(n) - k_{min}) \quad (7)$$

Here, $k_{min}$ and h are constants.

Learning Example

As a learning example according to the present invention, chaotic time series data prediction learning will be shown. Santa-Fe chaotic time series prediction, which is normally used as a benchmark for nonlinear time series prediction, is performed to examine how much the signal of y(n+1) can be reproduced when an input of y(n) is performed. The optical system of the optical signal processing device according to the embodiment of the present invention shown in FIG. 2 is reproduced in the simulation to compute whether the output of Santa-Fe chaotic time series can be approximated. The n-th response y(n) of Sante-Fe time series is given to the input, and the computation is performed using y(n+1) as the output to be estimated. At this time, the circulation time $T_3$ is set to $T_3=T_1=NT_2$. For the nonlinear element 217, an SOA is used.

The initial values of the weight vector $\omega_i$ in the output layer to be learned are all set to 1. Furthermore, α, which is the constant for determining the component $\Omega_{ij}$ of the mutual coupling matrix in the intermediate layer of the network, is selected to be 1.2. As α increases, the dynamics that constitute the reservoir become chaotic. Accordingly, α=1.2 is set so as to maximize the reservoir network within a range of showing no chaotic property. Setting in this manner increases storage capacity of the reservoir network, exhibiting an excellent function of improving learning performance for complicated dynamics such as in Santa-Fe. The learning is performed using an LSM method. A teacher signal of 1000 symbols is learned and then 1000 symbols are predicted.

FIGS. 6(a) to (d) show one example of, when mask processing is not performed, a teacher signal and an output signal after learning. Furthermore, FIGS. 7(a) to (d) show one example of, when mask processing is performed, a teacher signal and an output signal after learning. Here, the learning is performed under the condition where the number of nodes N=50, 100, 300, or 500.

For reference, FIGS. 6(a) to (d) show the results when the number of delay taps K in Formula (3) is 0, that is, when mask processing is not performed. From the figures, it can be understood that the learning cannot be performed even when the number of nodes is increased.

FIGS. 7(a) to (d) show the learning results when the number of delay taps K=N/2 is set. The waveform of the output signal after learning gives a good approximation to the waveform of the teacher signal, which shows the effectiveness of the mask method of Formula (3).

REFERENCE SIGNS LIST

100 RC circuit
101 Input layer

102 Intermediate layer
103 Output layer
200 Optical signal processing device
210 Optical transmission path
211 Laser light source
212 Optical modulator
213 Optical FIR filter unit
214, 218 Optical coupler
215 Optical circulation unit
216 Variable attenuator
217 Nonlinear response element
219 Optical receiver
220 Electric signal processing circuit
231 Attenuator group
232 Phase shifter group
511 Optical splitter
512 Delay line group
513 VOA group
514 Phase shifter group
515 Optical coupler

The invention claimed is:

1. An optical signal processing device comprising:
a light source generating an optical signal;
first optical modulation means for modulating at least one of intensity and phase of the optical signal at a first modulation period to generate an input signal;
second optical modulation means for modulating at least one of intensity and phase of the input signal at a second modulation period;
an optical circulation unit in which the modulated input signal circulates at a predetermined delay length;
optical multiplex means for joining the modulated input signal in the optical circulation unit;
a nonlinear response element giving nonlinearity to the optical signal circulating in the optical circulation unit;
variable optical modulation means for modulating the optical signal circulating in the optical circulation unit;
first optical branch means for branching part of the optical signal circulating in the optical circulation unit;
optical reception means for demodulating branched light output from the first optical branch means to obtain an intermediate signal; and
a signal processing circuit for weighting the intermediate signal with any coupling weight and taking a sum to obtain an output signal, wherein
the signal processing circuit changes the coupling weight so as to reduce an error between the output signal and a teacher signal.

2. The optical signal processing device according to claim 1, wherein the second optical modulation means is a finite impulse response filter.

3. The optical signal processing device according to claim 2, wherein the second optical modulation means comprises:
second optical branch means for N-branching (N is an integer of 2 or more) the input signal;
N delay lines being connected to each of N branches of the second optical branch means and having different delay lengths;
control means for individually controlling intensity or phase of the input signal passing through the N delay lines; and
optical multiplex means for joining again the input signal controlled by the control means.

4. The optical signal processing device according to claim 1, wherein at least one of the second optical modulation means and the optical circulation unit comprises an optical waveguide structure.

5. The optical signal processing device according to claim 1, wherein the predetermined delay length is 10 times or more the second modulation period.

6. The optical signal processing device according to claim 2, wherein at least one of the second optical modulation means and the optical circulation unit comprises an optical waveguide structure.

7. The optical signal processing device according to claim 3, wherein at least one of the second optical modulation means and the optical circulation unit comprises an optical waveguide structure.

8. The optical signal processing device according to claim 2, wherein the predetermined delay length is 10 times or more the second modulation period.

9. The optical signal processing device according to claim 3, wherein the predetermined delay length is 10 times or more the second modulation period.

10. The optical signal processing device according to claim 4, wherein the predetermined delay length is 10 times or more the second modulation period.

* * * * *